United States Patent
Misawa

(10) Patent No.: US 7,633,548 B2
(45) Date of Patent: Dec. 15, 2009

(54) IMAGE CAPTURING APPARATUS WITH A LENS BARRIER THAT IS A PORTION OF A BODY OF THE IMAGE CAPTURING APPARATUS

(75) Inventor: Atsushi Misawa, Saitama-ken (JP)

(73) Assignee: FUJIFILM Corporation, Tokyo (JP)

( * ) Notice: Subject to any disclaimer, the term of this patent is extended or adjusted under 35 U.S.C. 154(b) by 728 days.

(21) Appl. No.: 11/274,180

(22) Filed: Nov. 16, 2005

(65) Prior Publication Data

US 2006/0066749 A1 Mar. 30, 2006

Related U.S. Application Data

(62) Division of application No. 09/801,779, filed on Mar. 9, 2001, now Pat. No. 7,034,884.

(30) Foreign Application Priority Data

Mar. 9, 2000 (JP) ............... 2000-65309

(51) Int. Cl.
*H04N 5/225* (2006.01)
(52) U.S. Cl. ............... 348/376; 348/50; 348/372; 396/326; 396/448
(58) Field of Classification Search ............ 348/42, 348/47, 220.1, 362, 373–376, 50, 372; 396/320, 396/323, 324, 424, 448, 535, 326; D16/200, D16/204, 207, 210, 224, 237, 242; 359/511
See application file for complete search history.

(56) References Cited

U.S. PATENT DOCUMENTS

| | | | | |
|---|---|---|---|---|
| 2,725,804 A | * | 12/1955 | Herzfeld | 396/323 |
| 4,124,022 A | * | 11/1978 | Gross | 600/28 |
| 4,451,130 A | | 5/1984 | Yan | |
| 4,999,713 A | * | 3/1991 | Ueno et al. | 348/240.3 |
| 5,115,265 A | * | 5/1992 | Swayze | 396/424 |
| 5,406,413 A | * | 4/1995 | Mogamiya | 359/511 |
| 5,479,229 A | * | 12/1995 | Minamikawa | 396/323 |
| 6,166,765 A | * | 12/2000 | Toyofuku | 348/220.1 |
| D442,616 S | * | 5/2001 | Ohmori et al. | D16/204 |
| D442,617 S | * | 5/2001 | Ohmori et al. | D16/204 |
| 6,229,569 B1 | * | 5/2001 | Saito et al. | 348/362 |

(Continued)

FOREIGN PATENT DOCUMENTS

GB 2257597 A * 1/1993

(Continued)

*Primary Examiner*—Lin Ye
*Assistant Examiner*—Dennis Hogue
(74) *Attorney, Agent, or Firm*—Sughrue Mion, PLLC

(57) ABSTRACT

An image capturing apparatus, such as a digital camera, having a movable lens barrier or cover which can easily be opened and closed to operate the image capturing apparatus in various predetermined modes depending on the position of the lens barrier. In one preferred embodiment, the image capturing apparatus has a body having a front face, a back face and a side face, which is between the front face and back face. A lens section is provided on the body and is operable to form an image. A lens barrier is operable to cover the front face, back face and side face of the body and to pivotally move around an axis which is substantially parallel to an optical axis of the lens section.

8 Claims, 16 Drawing Sheets

U.S. PATENT DOCUMENTS

| | | | |
|---|---|---|---|
| 6,247,855 B1 * | 6/2001 | Motohashi et al. | 396/448 |
| 6,414,709 B1 * | 7/2002 | Palm et al. | 348/47 |
| 2002/0021895 A1 * | 2/2002 | Kanai et al. | 396/103 |

FOREIGN PATENT DOCUMENTS

| | | |
|---|---|---|
| JP | 53-116215 | 10/1978 |
| JP | 62-024555 | 2/1987 |
| JP | 62-056288 | 11/1987 |
| JP | 03-043308 | 2/1991 |
| JP | 04-000287 | 1/1992 |
| JP | 7-13243 | 1/1995 |
| JP | 7-225410 | 8/1995 |
| JP | 2585803 | 12/1996 |
| JP | 9-230464 | 9/1997 |
| JP | 2000310806 A * | 11/2000 |

* cited by examiner

IMAGE CAPTURING APPARATUS WITH A LENS BARRIER THAT IS A PORTION OF A BODY OF THE IMAGE CAPTURING APPARATUS

This is a divisional of application Ser. No. 09/801,779 filed Mar. 9, 2001 now U.S. Pat. No. 7,034,884. The entire disclosure of the prior application Ser. No. 09/801,779 is considered part of the disclosure of the accompanying divisional application and is hereby incorporated by reference.

This patent application claims priority based on Japanese Patent Application No. 2000-65309, filed on Mar. 9, 2000, the contents of which are incorporated herein by reference as though set forth at length.

BACKGROUND OF THE INVENTION

1. Field of the Invention

The present invention relates to an image capturing apparatus. More particularly, the present invention relates to an image capturing apparatus, for example, a digital camera, with a lens cover, which can easily be opened and closed to operate the image capturing apparatus in various predetermined modes.

2. Description of the Related Art

Various types of conventional lens barriers or covers have been developed for cameras. For example, Japanese Patent Applications Laid-Open Nos. 7-13243 and 9-230464 disclose a camera having a lens cover for covering buttons for operating the camera and the like. Moreover, a camera having a slidable cover (Japanese Patent Application Laid-Open No. 7-225410) and a digital electronic still camera in which operation modes thereof can be changed depending on the position of the lens barrier or cover (Japanese Patent No. 2585803) have also been disclosed.

Recently, the functions or operations of a digital camera have been greatly diversified. Therefore, the number of buttons for operating the camera has also increased making operation of the digital camera complicated. Thus, there is a need for an image capturing apparatus, such as a camera, having enhanced operability. In addition, typically an image capturing apparatus has a wide range of users, such as professionals as well as casual users who enjoy taking pictures for fun. Therefore, there is also a need for an image capturing apparatus that can satisfy all such users.

SUMMARY OF THE INVENTION

Therefore, it is an object of the present invention to provide an image capturing apparatus that overcomes the above described shortcomings. These and other objectives are achieved by preferred combinations as set forth in the independent claims. The dependent claims define further advantageous and exemplary combinations of the present invention.

According to a first aspect of the present invention, a capturing apparatus for capturing an image includes a body having a front face, a back face and a side face provided between the front face and the back face. A lens section is provided on the body, which is operable to form an image. A lens barrier operable to cover the front face, the back face and the side face of the body and to pivotally move around an axis substantially parallel to an optical axis of the lens section is provided.

In an embodiment of the present invention, the lens barrier has a grip for contact by a user's hand during image capturing.

In another embodiment of the present invention, the body of the image capturing apparatus has a generally arc-shaped portion. The lens barrier pivotally moves along the arc-shaped portion. The body may have a substantially cylindrical shape in which the front face and the back face are circular.

In still another embodiment of the present invention, the lens barrier pivotally moves around an axis that is positioned approximately at or proximate to the center of the body and the lens barrier is capable of stopping on a right side or a left side of the body.

The image capturing apparatus may further include a mode selector operable to change a first operation mode to a second operation mode in accordance with a position of the lens barrier. The operation modes include at least a capture mode in which the lens section is exposed and a non-capture mode in which the lens section is covered by the lens barrier. The mode selector sets the capture mode when the lens barrier stops on the right side or the left side of the body.

In yet another embodiment of the present invention, the lens barrier includes legs provided on a face thereof covering the side face of the body. The legs support the capturing apparatus in a stable position when the legs are positioned on the bottom side of the body.

The capturing apparatus may further include a mode selector operable to change a first operation mode to a second operation mode in accordance with a position of the lens barrier. The operation modes include at least a self-timer capture mode. The mode selector sets the self-timer capture mode when the lens barrier stops on the bottom side of the body.

Moreover, the capturing apparatus may further include a mode selector operable to change a first operation mode to a second operation mode in accordance with a position of the lens barrier. The operation modes include at least a playback mode. The mode selector sets the playback mode when the lens barrier stops on the bottom side of the body.

In yet another embodiment of the present invention, the capturing apparatus includes a connection part operable to connect the capturing apparatus to external equipment. The lens barrier includes an opening operable to expose the connection part.

It is preferable that the lens barrier may be removable from the body of the capturing apparatus.

According to a second aspect of the present invention, a capturing apparatus for capturing an image includes a body having a front face and a back face, both faces having an approximately heart-like shape, and a side face provided between the front face and the back face. First and second lens sections, each operable to converge an image, are provided. First and second lens barriers, which are operable to protect the first and second lens sections, respectively, are provided, wherein the first and second lens sections are arranged on an upper region of the front face of the body and are substantially parallel to each other. The first and second lens barriers cover at least parts of the front face, the back face and the side face, and are pivotally movable, independently of each other, around corresponding axes which are substantially parallel to respective optical axes of the first lens section and the second lens section, to protect the first and second lens sections, respectively.

In an embodiment of the present invention, the first and second lens sections are operable to capture two images simultaneously. The capturing apparatus has operation modes including at least a single-image capture mode in which only one image is captured and a double-image capture mode in which two images are simultaneously captured. The single-image capture mode is selected when only the first lens section is exposed and the double-image capture mode is selected when both of the first and second lens sections are exposed.

The first and second lens sections may be operable to perform stereoscopic image capturing in the double-image capture mode. Moreover, the first and second lens sections may be operable to capture the two images with different zooming power in the double-image capture mode.

It is preferable that the first and second lens barriers may be removable from the body of the capturing apparatus.

This summary of the invention does not necessarily describe all necessary features of the present invention. The present invention may also be a sub-combination of the above described features. The above and other features and advantages of the present invention will become more apparent from the following description of preferred embodiments taken in conjunction with the accompanying drawings.

DETAILED DESCRIPTION OF THE INVENTION

The invention is described based on preferred embodiments, which is not intended to limit the scope of the present invention but merely to exemplify the invention. As used herein, "lens barrier" means a cover or shield to protect a lens and/or other parts of an image capturing apparatus, for example, a camera having buttons for operating the camera and an LCD monitor and panel.

Figure 1:
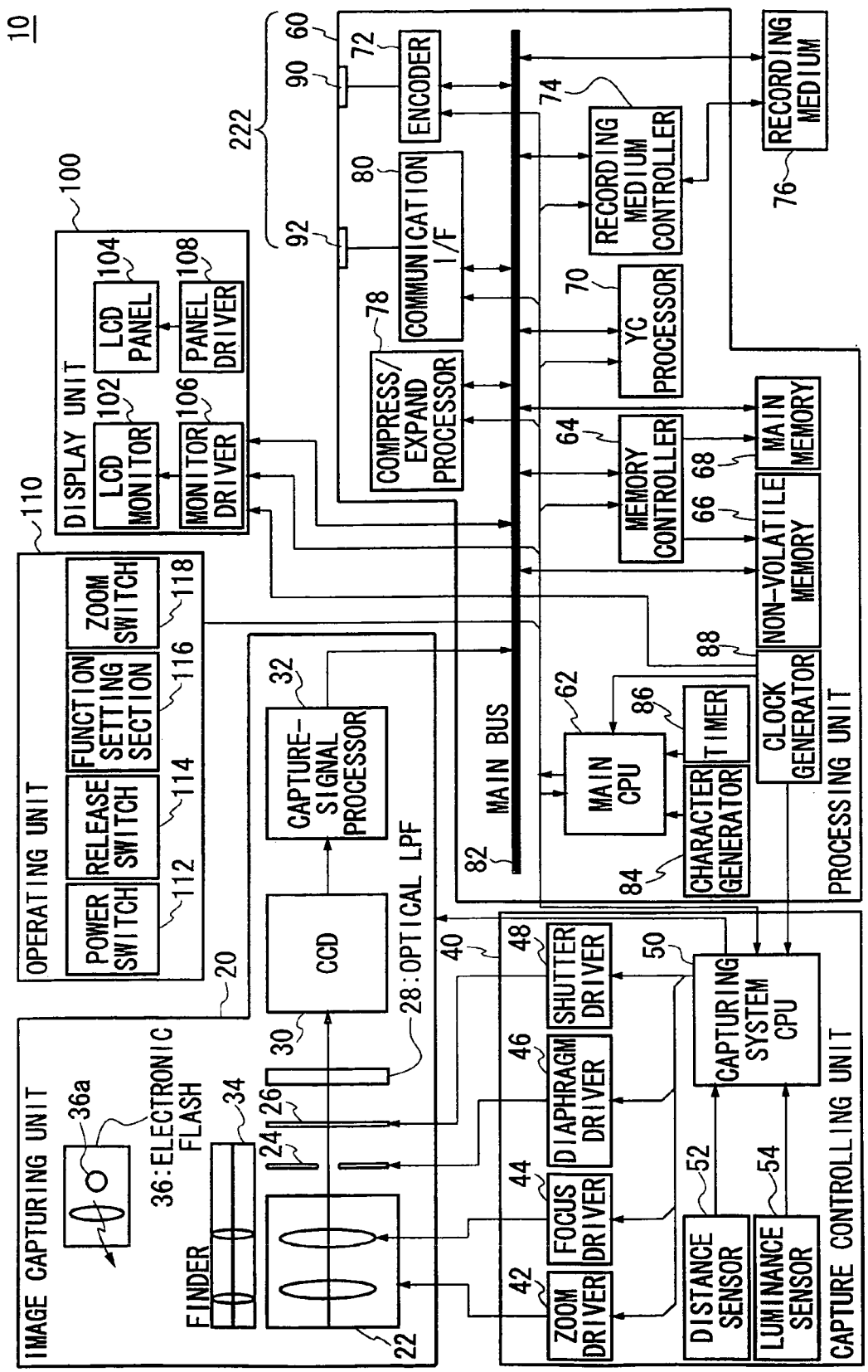
FIG. 1 is a schematic representation of a structure of a digital camera according to a first embodiment of the present invention.

FIG. 1 is a schematic representation of a digital camera 10 according to an embodiment of the present invention. A lens barrier or cover according to the present invention is described in detail with reference to FIGS. 2A and 2B. The digital camera 10 has an image capturing unit 20, a capture controlling unit 40, a processing unit 60, a display unit 100 and an operating unit 110.

The image capturing unit 20 includes mechanical members and electric members related to image capturing and image formation. The image capturing unit 20 includes a lens section 22, a diaphragm 24, a shutter 26, an optical LPF (low-pass filter) 28, a CCD (charge-coupled device) 30 and a capture-signal processor 32. The lens section 22 includes a focus lens, a zoom lens, and the like. The lens section 22 has an optical axis 23, illustrated in FIG. 3B. This structure allows an image of a subject to be formed on a light receiving surface of the CCD 30. In accordance with the amount of light of the formed image of the subject, respective sensor elements (not shown) of the CCD 30 are electrically charged. (Hereinafter, the electric charges stored in the sensor elements are referred to as stored electric charges.) The stored electric charges are read by a read-gate pulse into a shift register (not shown), and are then successively read out as a voltage signal by a register transfer pulse.

The digital camera 10 generally has an electronic shutter function. Therefore, it is not essential for the digital camera 10 to include a mechanical shutter. In order to realize the electronic shutter function, the CCD 30 is provided with a shutter drain via a shutter gate. When the shutter gate is driven, the stored electric charges are drained out into the shutter drain. By controlling the shutter gate, a time period in which the respective sensor elements are electrically charged, i.e., a shutter speed, can be controlled.

The voltage signal output from the CCD 30, that is an analog signal, is subjected to color separation for separating the signal into R, G and B components in the capture-signal processor 32 to thereby adjust the white balance. Next, the capture-signal processor 32 performs gamma correction. Then, the R, G and B signals are successively subjected to A/D conversion at necessary times. Digital image data obtained by the above operations (hereinafter, simply referred to as "digital image data") is output to the processing unit 60.

The image capturing unit 20 further includes a finder 34 and an electronic flash 36. The finder 34 may includes an LCD (not shown) therein. In this case, various types of information from a main CPU 62 and the like can be displayed within the finder 34. The electronic flash 36 works by emission of light by a discharge tube 36a when energy stored in a condenser (not shown) is supplied to the discharge tube 36a.

The capture controlling unit 40 includes a zoom driver 42, a focus driver 44, a diaphragm driver 46, a shutter driver 48, a capturing system CPU 50 for controlling these drivers, a distance sensor 52 and a luminance sensor 54. Each of the drivers 42, 44, 46 and 48 has a driving means such as a stepping motor. When a release switch 114, described later, is pressed down, the distance sensor 52 measures a distance to the subject while the luminance sensor 54 measures a luminance of the subject. The measured data of the distance (hereinafter, simply referred to as "distance data") and the measured data of the luminance (hereinafter, simply referred to as "luminance data") are sent to the capturing system CPU 50. The capturing system CPU 50 performs adjustments of a magnifying power and a focus of the lens section 22 by controlling the zoom driver 42 and the focus driver 44 based on image capturing information, such as magnification, specified by a user.

The capturing system CPU 50 determines the F-number and the shutter speed based on an added value of the R, G and B digital signals of one image frame, that is, AE information. In accordance with the determined F number and the shutter speed, the diaphragm driver 46 adjusts the size of an aperture and the shutter driver 48 performs opening/closing functions of the shutter 26.

Moreover, the capturing system CPU 50 controls the light emission by the electronic flash 36 based on the luminance data and also adjusts the aperture size of the diaphragm 24. When the user instructs the digital camera 10 to capture an image, the CCD 30 starts to be electrically charged. After the shutter period calculated from the luminance data has elapsed, the stored electric charges are output to the capture-signal processor 32.

The processing unit 60 includes a main CPU 62 for controlling the whole digital camera 10, especially the processing unit 60; a memory controller 64; a YC processor 70; a recording medium controller 74; a compress/expand processor 78; and a communication interface (I/F) 80, which are controlled by the main CPU 62. The main CPU 62 communicates with the capturing system CPU 50 by serial communication, or the like. An operation clock of the main CPU 62 is supplied from a clock generator 88 that also supplies clocks having different frequencies to the capturing system CPU 50 and the display unit 100, respectively.

In addition to the main CPU 62, a character generator 84 and a timer 86 are provided in the processing unit 60. The timer 86 has a back-up battery cell so that the timer 86 always maintains the time and date. Based on the counted values, information regarding the image capturing date and other information related to the time are sent to the main CPU 62. The character generator 84 generates character information such as the image capturing date, a title of the captured image, or the like. The character information which is generated is appropriately combined with the captured image.

The memory controller 64 controls a non-volatile memory 66 and a main memory 68. The non-volatile memory 66 includes an EEPROM (electrically erasable and programmable ROM) and/or a flash memory, or the like, and stores various data to be held even when the power of the digital camera 10 is turned off, such as information set by a user and parameters which were set when the digital camera 10 was shipped. The non-volatile memory 66 may store a boot program for the main CPU 62 or a system program, if necessary. On the other hand, the main memory 68 is composed of a relatively inexpensive memory having a larger capacity, such as a DRAM, in general. The main memory 68 has a function of a frame memory for storing data output from the image capturing unit 20, a function of a system memory for loading necessary programs, and a function of a working area. The non-volatile memory 66 and the main memory 68 communicate with the parts in the processing unit 60 and other parts outside the processing unit 60 via a main bus 82.

The YC processor 70 subjects the digital image data to YC conversion so as to generate a luminance signal Y and color-difference signals B-Y and R-Y. The luminance signal and the color difference signals are temporarily stored in the main memory 68 by the memory controller 64. The compress/expand controller 78 successively reads the luminance signal and the color-difference signals from the main memory 68 and compresses the signals that are read. The resultant data (hereinafter, simply referred to as "compressed data") is written into a memory card, that is a kind of recording medium 76, via the recording medium controller 74.

The processing unit 60 further includes an encoder 72. The encoder 72 inputs the luminance signal and the color-difference signals, converts these input signals into a video signal (NTSC or PAL signal), and then outputs the video signal from a video output terminal 90. In a case where the video signal is generated from data stored in the recording medium 76, the data is first supplied to the compress/expand processor 78 via the recording medium controller 74, and is then subjected to a necessary expansion operation in the compress/expand processor 78. Finally, the expanded data is converted into the video signal by the encoder 72.

The communication I/F 80 controls protocol conversion, or the like, in accordance with the communication specifications supported by the digital camera 10, such as USB, RS-232C or Ethernet. The communication I/F 80 includes a driver IC, if necessary, and communicates with external equipment, including a network, via a connector 92. In addition, the digital camera 10 may be configured to allow data communication with external equipment, such as a printer, a karaoke (sing-along machine), or a game player, via a special I/F, other than the above-mentioned standard specification. In this way, the digital camera 10 can be connected to external equipment via connection parts 222 (see FIG. 2A) including the video output terminal 90, the connector 92 and the like.

The display unit 100 includes an LCD monitor 102 and an LCD panel 104 that are controlled by a monitor driver 106 and a panel driver 108, respectively. The LCD monitor 102, which has a size of about 2 inches, for example, is provided on a back face of the digital camera 10, and displays a current operation mode such as a capturing mode or a playback mode, magnification of the image capturing or the playback image, the residual amount of the battery cell, the date, a screen for setting modes, an image of the subject, or the like. On the other hand, the LCD panel 104 is a small monochrome LCD, for example, and is provided on an upper face of the digital camera 10. The LCD panel 104 simply displays information such as the image quality, for example, FINE, NORMAL, BASIC, ON/OFF of the electronic flash, the number of images normally capturable, the number of pixels, and the battery capacity, or the like.

The operating unit 110 includes mechanisms and electric members required for a user to provide the digital camera 10 with settings or instructions for the operation and the operation mode of the digital camera 10. A power-switch 112 determines whether or not the power of the digital camera 10 is turned on or off. The release switch 114 has a two-step structure allowing partial activation and full activation of it. For example, when the release switch 114 is partially pressed, AF and AE are locked. Then, the release switch 114 is fully pressed, an image shot is taken into the digital camera 10 and is recorded in the main memory 68 and/or the recording medium 76 after necessary signal processing and data compression and the like are performed. The operating unit 110 may receive settings set by a switch other than the above-mentioned switches, such as a rotary mode dial or a cross key. These switches as a whole are labeled as a function setting part 116 in FIG. 1. The operations or functions that can be set by the operating unit 110 include "file format", "special effect", "print", "determine/store", and "change display", for example. A zoom switch 118 determines a zoom ratio of the digital camera 10.

The digital camera 10 having the above-mentioned structure operates in the following manner. First, the power switch 112 of the digital camera 10 is turned on, so that power is supplied to the respective units of the digital camera 10. The digital camera 10 has a plurality of operation modes including at least an image capture mode and an image playback mode. For example, the main CPU 62 determines which of the operation modes is currently selected by checking the state of the function setting section 116.

In the image capture mode, the main CPU 62 monitors the state of the release switch 114. When the release switch 114 is detected to be half-pressed, the main CPU 62 obtains the luminance data and the distance data from the luminance sensor 54 and the distance sensor 52, respectively. Based on the obtained data, the capture controlling unit 40 works to adjust a focus of the lens section 22 and the size of the aperture of the diaphragm 24. When the adjustment is finished, the user is notified, for example, by characters being displayed on the LCD monitor 102, such as "stand-by". Then, the main CPU 62 monitors the state of the release switch 114, i.e., whether or not it is completely pressed. When the release switch 114 is completely pressed, the shutter 26 is closed after a predetermined shutter period and the stored electric charges of the CCD 30 are then drained out to the capture-signal processor 32. The digital image data generated by the processing by the capture-signal processor 32 is output to the main bus 82. The output digital image data is stored temporarily in the main memory 68 and thereafter is subjected to the necessary processing in the YC processor 70 and the compress/expand processor 78. Then, the processed image data is sent to be recorded in the recording medium 76, via the recording medium controller 74. A frozen recorded image is displayed by the LCD monitor 102 for a predetermined period so that the user can confirm the image shot that has been captured. As described above, a sequence of the image capturing operation is finished.

A recording mode of the digital camera 10 is included in the image capture mode of the present embodiment as described above.

On the other hand, in the playback mode, the main CPU 62 reads the last image shot from the main memory 68, via the memory controller 64. The LCD monitor 102 displays the read image. In this state, when the user instructs the digital camera 10, via the function setting section 116, to perform a "NEXT" or "BACK" operation, the next image or the image just before the currently displayed image is read out to be displayed by the LCD monitor 102.

Moreover, the operation mode of the digital camera 10 is changed in accordance with the position at which the lens barrier 210 (see FIG. 2A) is stopped or positioned, as described later. Such an operation and the arrangement for that operation are described in detail later with reference to the accompanying drawings.

Figure 2A:
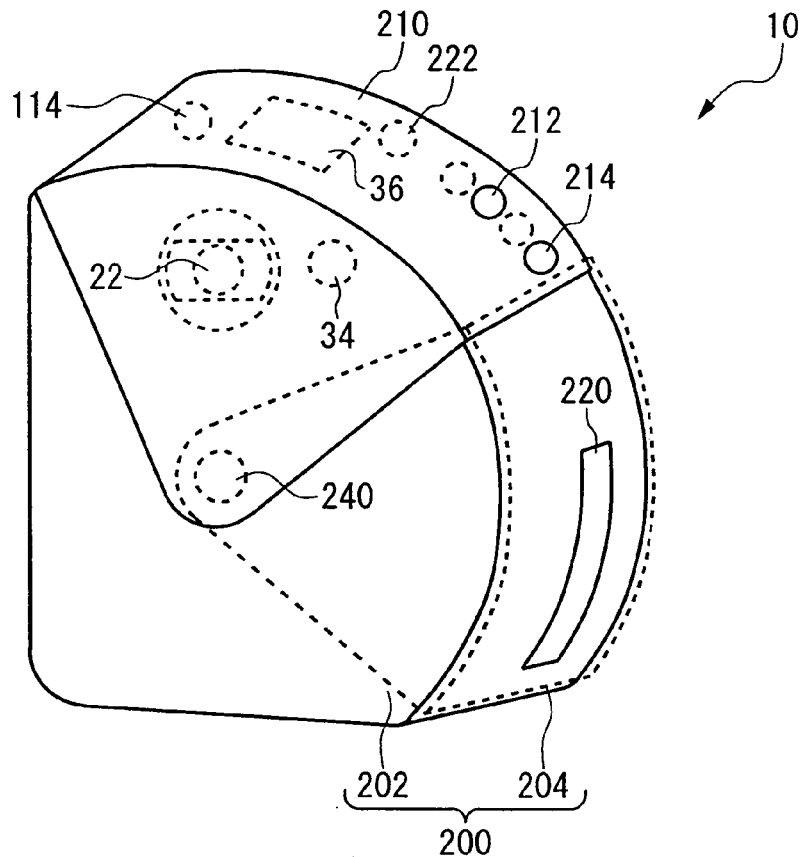
FIGS. 2A and 2B schematically show an appearance of a digital camera according to a first embodiment of the present invention.
Figure 2B:
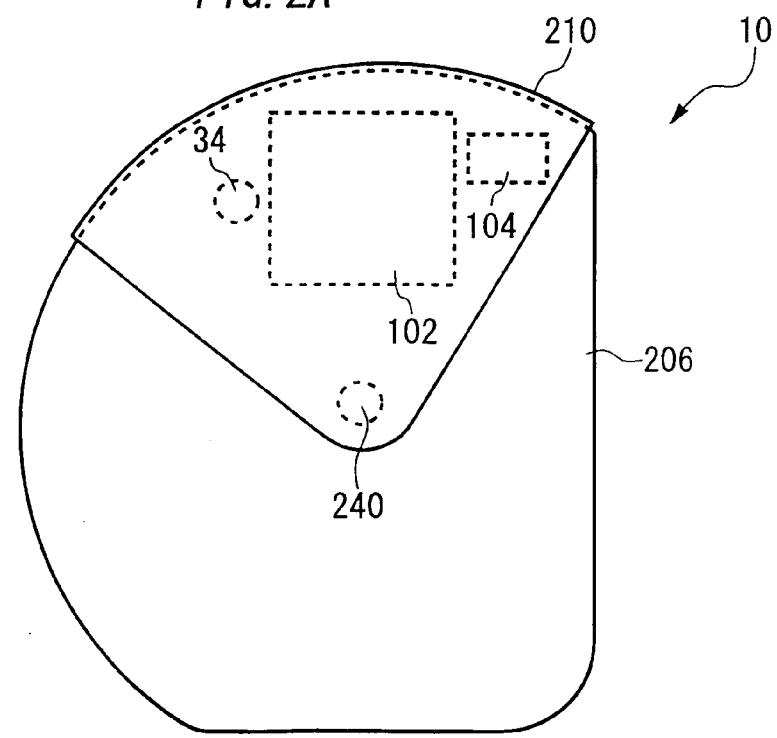

FIGS. 2A and 2B show the appearance of the digital camera 10 in the present embodiment. FIG. 2A is a perspective view of the digital camera 10 as viewed with the observer facing a front face 202 thereof, while FIG. 2B is a view thereof seen from a side of a back face 206. A body 200 of the digital camera 10 includes the front face 202, the back face 206, and a side face 204 provided between the front face 202 and the back face 206. The body 200 further includes an arc portion having an arc-like shape when seen from the side of the front face 202. On the front face 202, the lens section 22 and the finder 34 are arranged. On one side face 204, the release switch 114, the electronic flash 36, the connection part 222 and an opening 220 for inserting a recording medium are arranged in that order from the top to the bottom of the side face 204. On the back face 206, the LCD monitor 102 and the LCD panel 104 are arranged.

In addition, the digital camera 10 includes a lens barrier or cover 210 for protecting the lens section 22. The lens barrier 210 is provided so as to cover the front face 202, the side face 204 and the back face 206. The body 200 includes lens barrier attachments 240 which are located approximately at the center of the front face 202 and the back face 206. The lens barrier 210 is attached to these attachments 240 in such a manner that the lens barrier 210 can pivotally move, i.e., pivot, along the arc portion of the right side face 204 of the body 200 around a pivot axis 241 (see FIG. 3B). The lens barrier or cover 210 pivots around the axis 241 that connects the lens barrier attachments 240, which are provided on the front face 202 and the back face 206. The axis 241 is substantially parallel to an optical axis 23 of the lens section 22 (note FIG. 3B). The lens barrier 210 includes two openings 212 and 214 which are provided in a region of the lens barrier 210 that can cover the right side face 204. The two openings 212 and 214 can expose the connection parts 222 depending upon the position at which the lens barrier 210 stops.

The digital camera 10 shown in FIG. 2A is stopped or shut-off in a state where the lens section 22 is covered by the lens barrier 210. The connection parts 222 are located at parts of the digital camera 10 that are covered by the lens barrier 210. The connection parts 222 may be exposed through the openings 212 and 214 while the lens barrier 210 still covers the lens section 22. Since the connection parts 222 may be exposed through the openings 212 and 214, the connection parts 222 can be used while the lens section 22 is protected.

In this state, the finder 34, which is provided on the front face 202, the release switch 114, which is provided on the side face 204, and the LCD monitor 102 and the LCD panel 104, which are provided on the back face, are also covered by the lens barrier 210. Thus, the lens barrier 210 can protect members or parts of the digital camera 10, other than the lens section 22, when the digital camera 10 is not used, since the lens barrier 210 covers the front face 202, the side face 204 and the back face 206 of the body 200, as shown in FIGS. 2A and 2B.

The opening 220 for inserting a recording medium for storing data is provided on a lower part of the side face 204. Thus, the opening 220 for a recording medium is covered by the lens barrier 210 when the lens barrier 210 stops at a position that exposes the lens section 22. Therefore, it is possible to prevent a recording medium from being removed by mistake while an image is being displayed, recorded or subjected to an editing such as an erase.

The lens barrier 210 is removably attached and, therefore, the user can easily remove the lens barrier 210 from the body 200. It is preferable that the lens barrier 210 be made from material having large elasticity, for example. In this case, since the lens barrier 210 can easily be stretched in directions away from the front face 202 and the back face 206, the lens barrier 210 can easily be removed or attached to the camera body 200. In addition, the lens barrier 210 may be interchangeable with other barriers having various colors, designs and shapes.

Figure 3A:
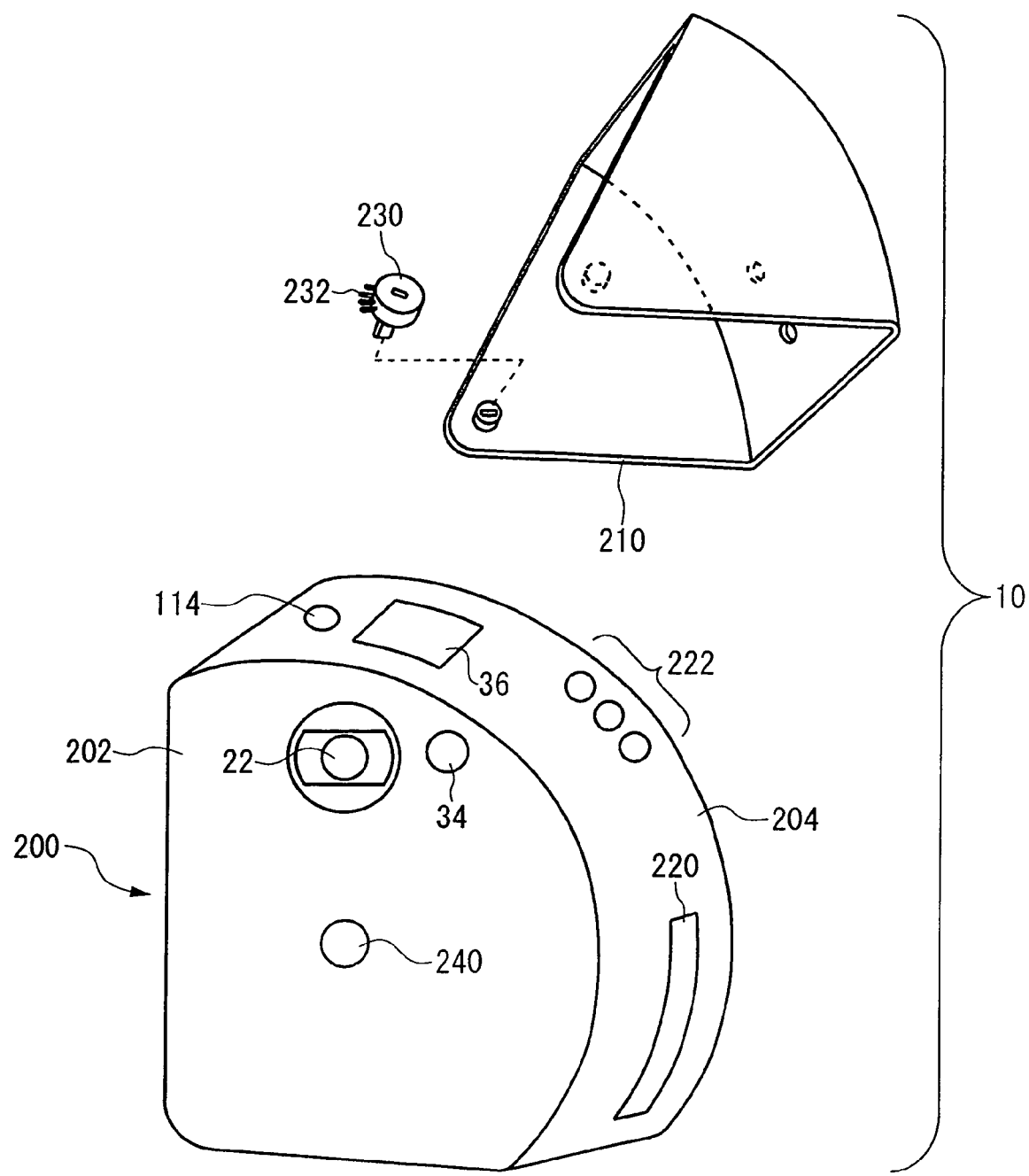
FIG. 3A shows a mode selector 230 attached to a lens barrier 210 and a lens barrier attachment 240 provided on a body 200 according to a first embodiment of the present invention and FIG. 3B is a side view thereof illustrating an optical axis 23 of a lens section 22 and a pivot axis 241 of the lens barrier 210.
Figure 3B:
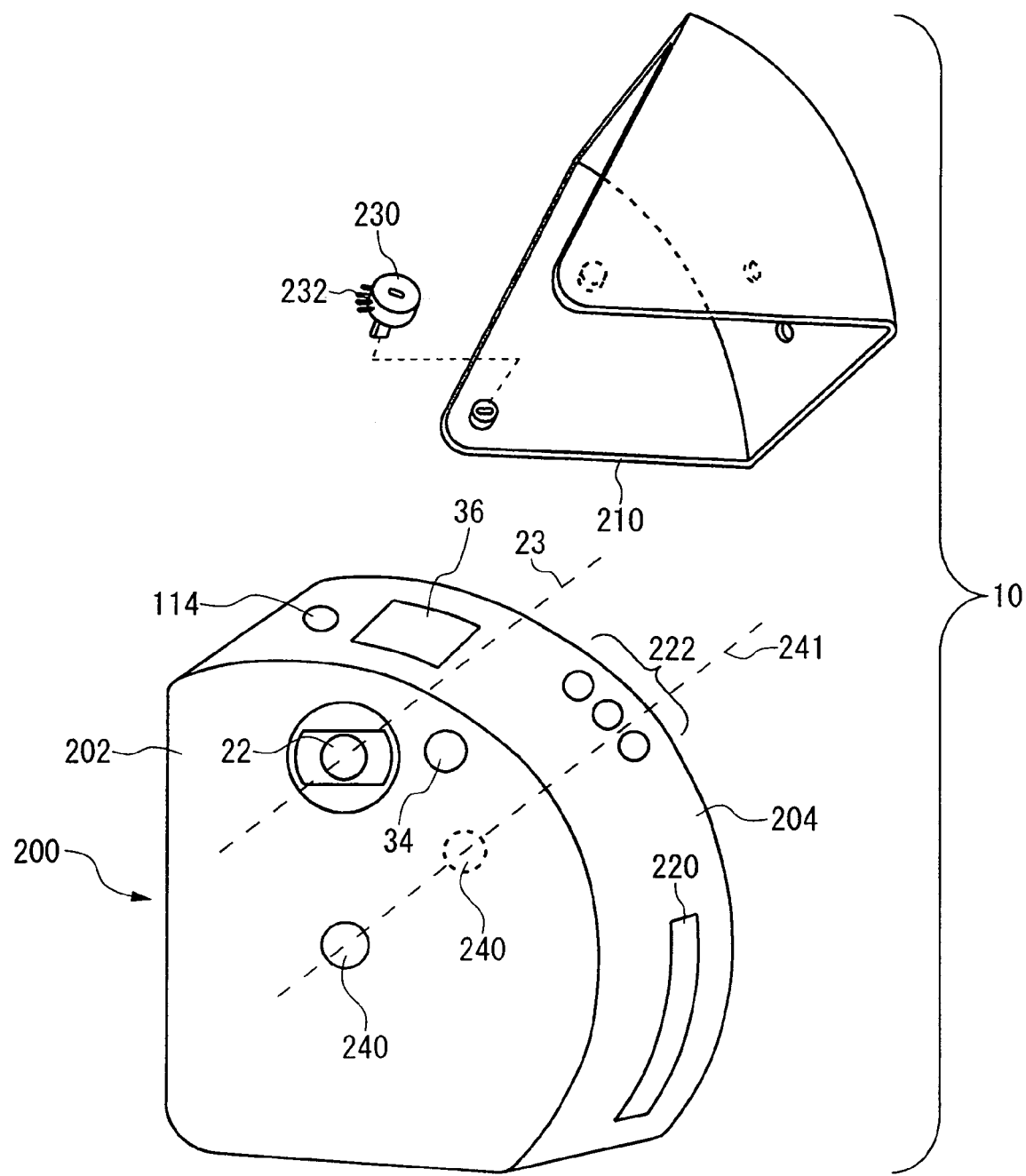

FIG. 3 shows a mode selector 230 attached to the lens barrier 210 and the lens barrier attachment 240 provided on the body 200. The mode selector 230 is a rotary-type switch that includes a plurality of convex portions or projections 232 which are to be fitted to the lens attachment 240. On the other hand, the lens barrier attachment 240 provided on the front face 202 includes concave portions or cavities into which the convex portions 232 of the mode selector 230 are fitted. When the lens barrier 210 pivots around the axis 241 (see FIG. 3B), the convex portions 232 of the mode selector 230 either fit into the concave portions of the barrier attachment 240 or come out of the concave portions of the barrier attachment 240. The main CPU 62 monitors the fitting of the convex portions 232 with the concave portions of the barrier attachment 240 and changes the operation mode when the convex portions 232 are fitted into the concave portions or when the convex portions 232 come out of the concave portions. Thus, the operation mode of the digital camera 10 can be changed in accordance with the position at which the lens barrier 210 stops.

The digital camera 10 has an image capture mode and a plurality of non-capture modes. When the lens barrier 210 is opened so as to expose the lens section 22, the image capture mode or the playback mode is set. When the lens section 22 is covered by the lens barrier 210, a non-capture mode is set. The non-capture modes may include a plurality of modes in which the connection parts 222 are exposed through the openings 212 and 214 while the lens barrier 210 covers the lens section 22 and a stop or shut-off mode in which the lens barrier 210 covers the lens section 22 and the connection parts 222. The mode selector 230 can select the above-mentioned operation modes in accordance with the position at which the lens barrier 210 stops. The correspondence of the positions of the lens barrier 210 to the operation modes is described below with reference to FIGS. 4A-7.

Figure 4A:
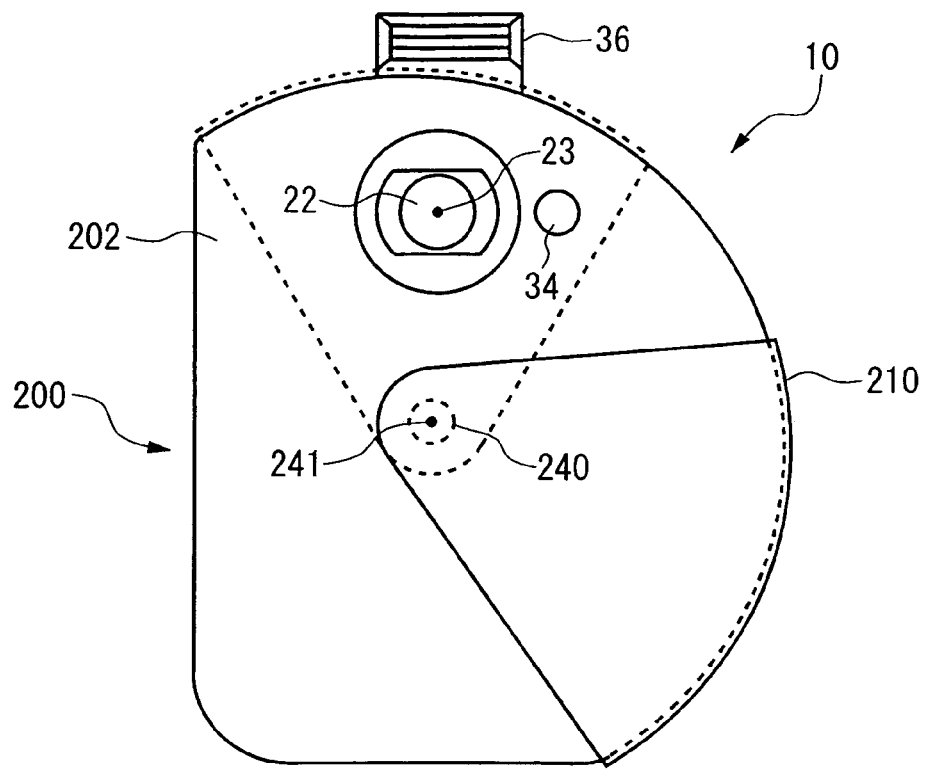
FIGS. 4A and 4B illustrate the digital camera 10 when the lens barrier 210 is opened to expose the lens section 22 according to a first embodiment of the present invention.
Figure 4B:
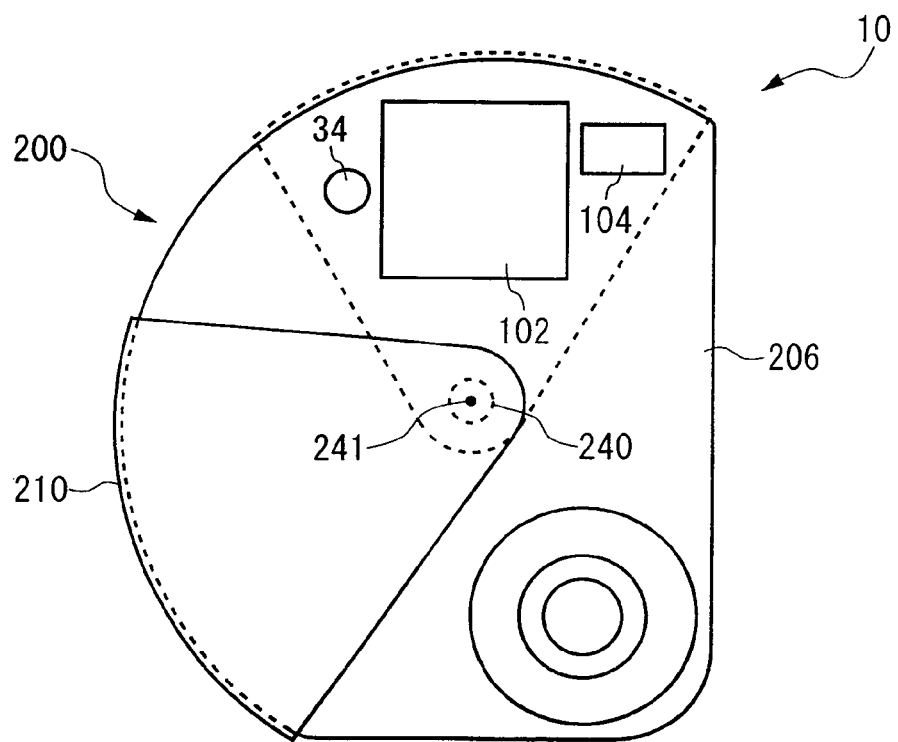

FIGS. 4A and 4B show the digital camera 10 when the lens barrier 210 is opened to expose the lens section 22. In this state, the digital camera 10 is set in the image capture mode or the image playback mode by a user, via the function setting section 116 by means of which one of the capture mode and the playback mode is selected. Referring to FIGS. 4A and 4B, the state of the digital camera 10 in the image capture mode is described. FIG. 4A shows the front face 202 of the digital camera 10, while FIG. 4B shows the back face 206 of the digital camera 10. The lens section 22 and the finder 34 are not covered by the lens barrier 210 in the image capture mode. The electronic flash 36 arranged inside the body 200 projects from the body 200 so as to be positioned above the lens section 22. The electronic flash 36 may operate together with the lens barrier 210 in such a manner that the electronic flash 36 projects from the body 200 when the lens barrier 210 is opened. Alternatively, the electronic flash 36 may be configured in such a manner that the electronic flash 36 moves independently of the lens barrier 210, and is projected by operation of a button and is manually put back into the body 200.

On the back face 206 of the digital camera 10 shown in FIG. 4B, the LCD monitor 102 and the LCD panel 104 are provided. Thus, since the LCD monitor 102 and the LCD panel 104 are exposed in the image capture mode, the user can perform the image capturing operation, the playback operation, the recording operation and the editing operation, such as an erasing operation, while viewing the LCD monitor 102.

In addition, in this image capture mode, the opening 220 for a recording medium, which is provided on the lower part of the side face 204, is covered by the lens barrier 210. Therefore, it is possible to prevent a recording medium from being ejected out off the opening 220 by mistake during an image capturing operation. Accordingly, in the image capture mode and the playback mode, it is possible to securely read data from a recording medium and to write data onto a recording medium.

Moreover, the lens barrier 210 may be configured in such a manner that the image capture mode is set when the release switch 114 (see FIG. 2A) is not covered by the lens barrier 210 and the playback mode is set when the release switch 114 is covered by the lens barrier 210, but the LCD panel 104 is not covered by the lens barrier 210.

Figure 5:
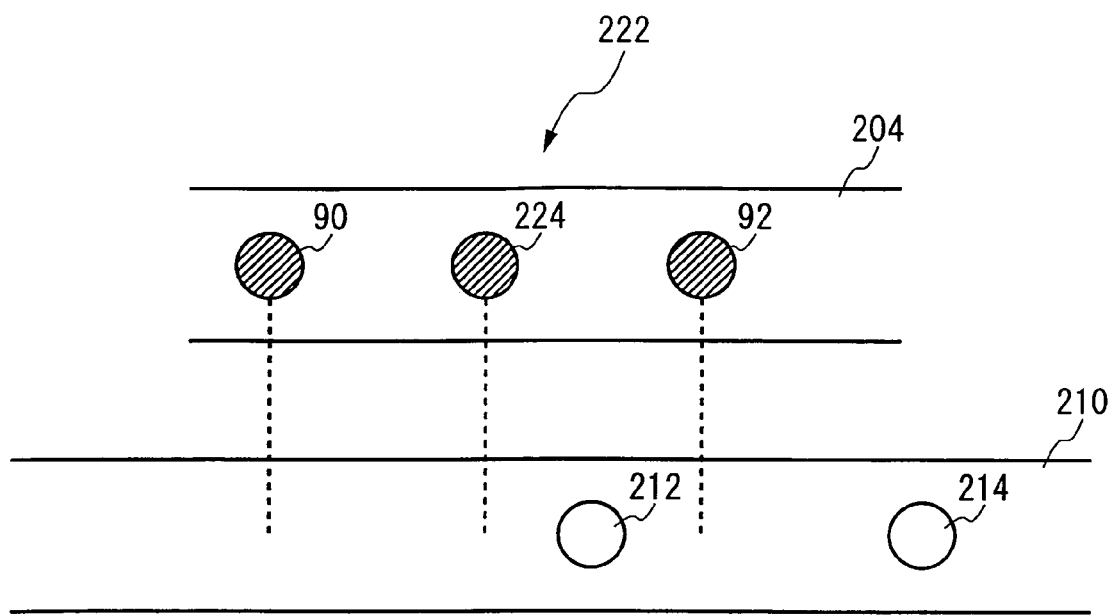
FIG. 5 schematically represents connection parts 222 and openings 212 and 214 when the lens barrier 210 covers the lens section according to a first embodiment of the present invention.

FIG. 5 schematically illustrates the connection parts 222 and the openings 212 and 214 in a case where the lens barrier 210 is positioned as shown in FIGS. 2A and 2B, that is, the lens barrier 210 stops at the upper part of the digital camera 10. When the lens barrier 210 stops at the upper part of the digital camera 10, the digital camera 10 is set in the stop mode, thereby the power of the digital camera 10 is automatically turned off. Thus, it is possible to prevent inadvertent failure to turn off the power of the digital camera 10. Moreover, the LCD monitor 102 and the LCD panel 104 arranged on the back face 206 are also covered by the lens barrier 210. Therefore, not only the lens section 22 but also the LCD monitor 102 and the LCD panel 104 can be protected from dust and the like when the digital camera 10 is not in use.

On the side face 204 of the digital camera 10, the video output terminal 90 and the connector 92 for input/outputting data are provided as the connection parts 222. Moreover, the side face 204 of the body 200 of the digital camera 10 is provided with a charge connector 224 for supplying electric power to the digital camera 10. The connection parts 222 are arranged at such positions so that they can be exposed through the openings 212 and 214 while the lens barrier 210 covers the lens section 22. That is, the connection parts 222 are arranged on the upper part of the side face 204. Therefore, video output, data input/output and charging functions can be performed while the lens section 22 is protected by the lens barrier 210.

When the lens barrier 210 stops as shown in FIG. 5, the video output terminal 90, the connector 92 and the charge connector 224 are covered by the lens barrier 210. Thus, when the digital camera 10 is not in use, the connection parts 222 can be protected by the lens barrier 210.

Figure 6:
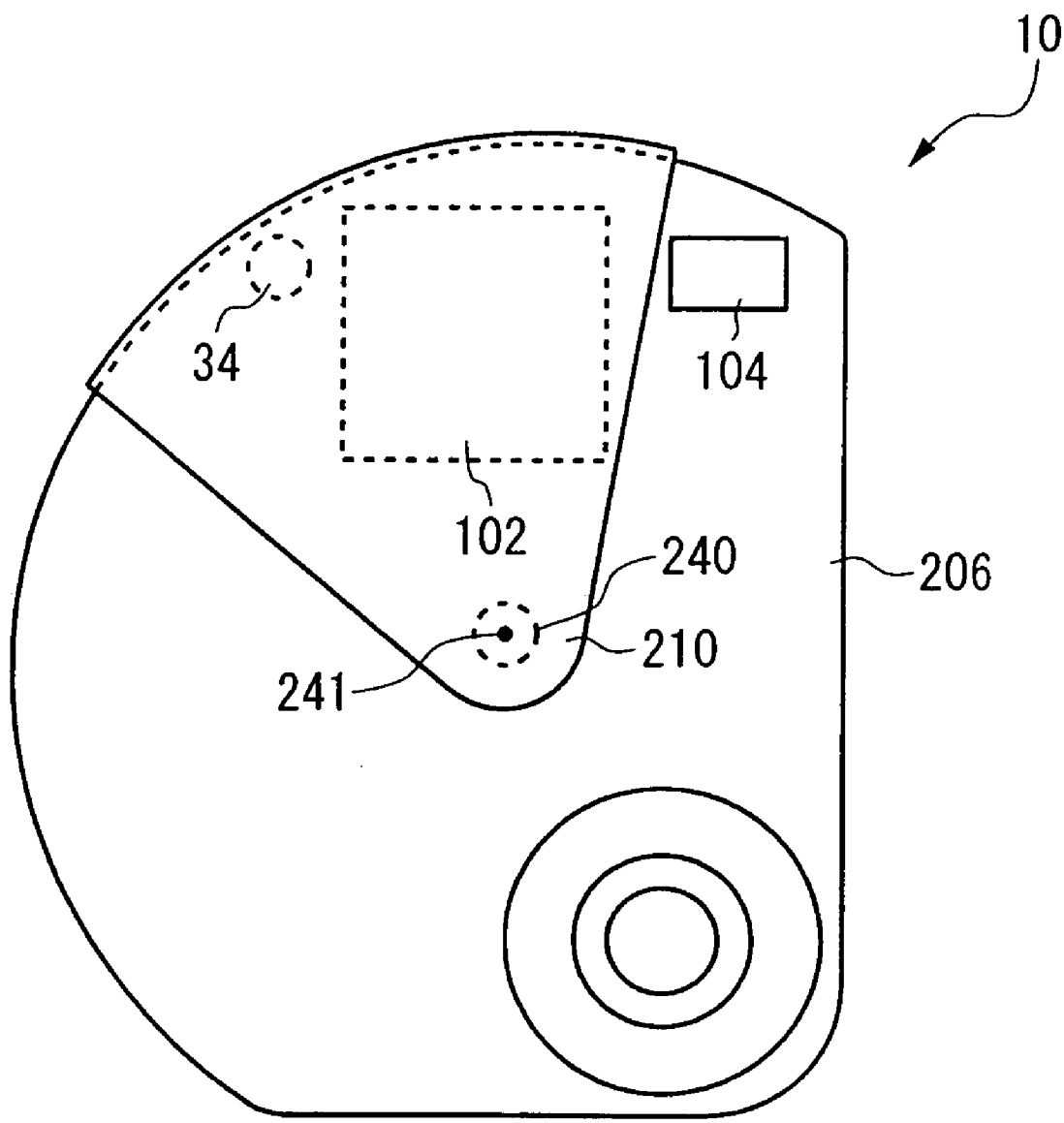
FIG. 6 shows a back face 206 of the digital camera 10 when the lens barrier 210 covers the lens section and the digital camera 10 is set in a mode in which it is operable according to a first embodiment of the present invention.

FIG. 6 shows the back face 206 of the digital camera 10 when the lens barrier 210 covers the lens section 22 and the operation mode in which the connection parts 222 can be used is selected. The lens barrier 210 can stop at any of a plurality of positions while the lens barrier 210 covers the lens section 22. The mode selector 230 (see FIG. 3) selects the operation mode in accordance with the stop position of the lens barrier 210. In this state, the LCD monitor 102 is covered by the lens barrier 210, whereas the LCD panel 104 is not covered by the lens barrier 210. The LCD panel 104 displays information corresponding to the operation mode which is currently set. Therefore, the user can perform the operation in the operation mode which is currently set with reference to the contents displayed on the LCD panel 104, even in a case where the LCD monitor 102 is covered by the lens barrier 210.

Figure 7:
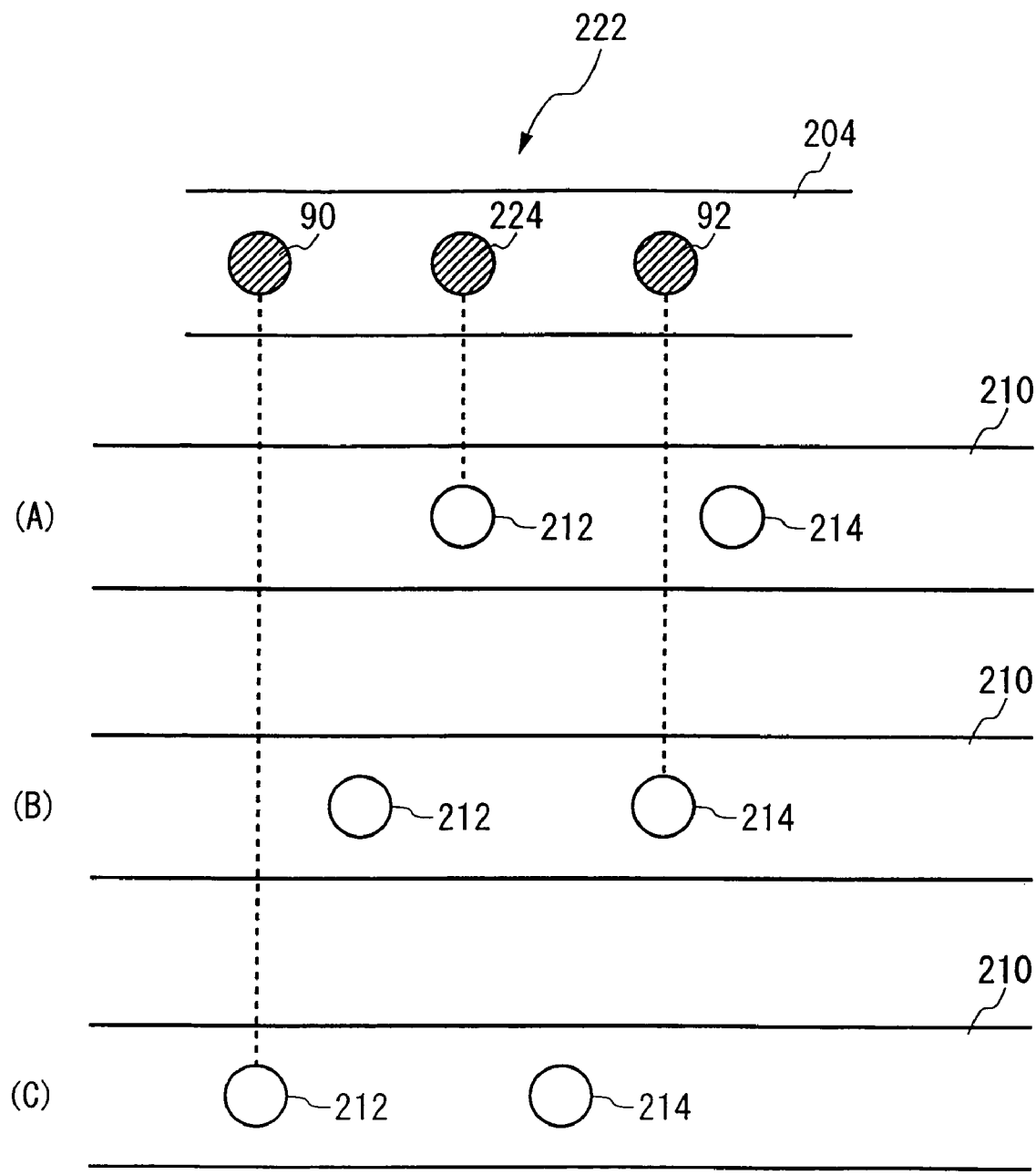
FIG. 7 schematically represents the openings 212 and 214 when the lens barrier 210 covers the lens section.

FIG. 7 schematically shows the openings 212 and 214 in a state where the lens barrier 210 covers the lens section 22. Referring to FIG. 7, the stop positions of the lens barrier 210 and the operation modes corresponding thereto are described.

When the lens barrier 210 stops at position (A) shown in FIG. 7, the charge connector 224 is exposed through the opening 212, so that the operation mode is changed to a charge mode. When the lens barrier 210 stops at position (B) shown in FIG. 7, the connector 92 is exposed through the opening 214, so that the operation mode is changed to a data transfer mode. When the lens barrier 210 stops at position (C) shown in FIG. 7, the video output terminal 90 is exposed through the opening 212, so that the operation mode is changed to a video output mode. In this way, only the connector of the connection parts 222 that is required in the corresponding operation mode is exposed. Thus, the user can easily operate the digital camera 10. In addition, the connector that is not required is protected by the lens barrier 210, thereby preventing dust, or the like, from entering the connector.

Figure 8A:
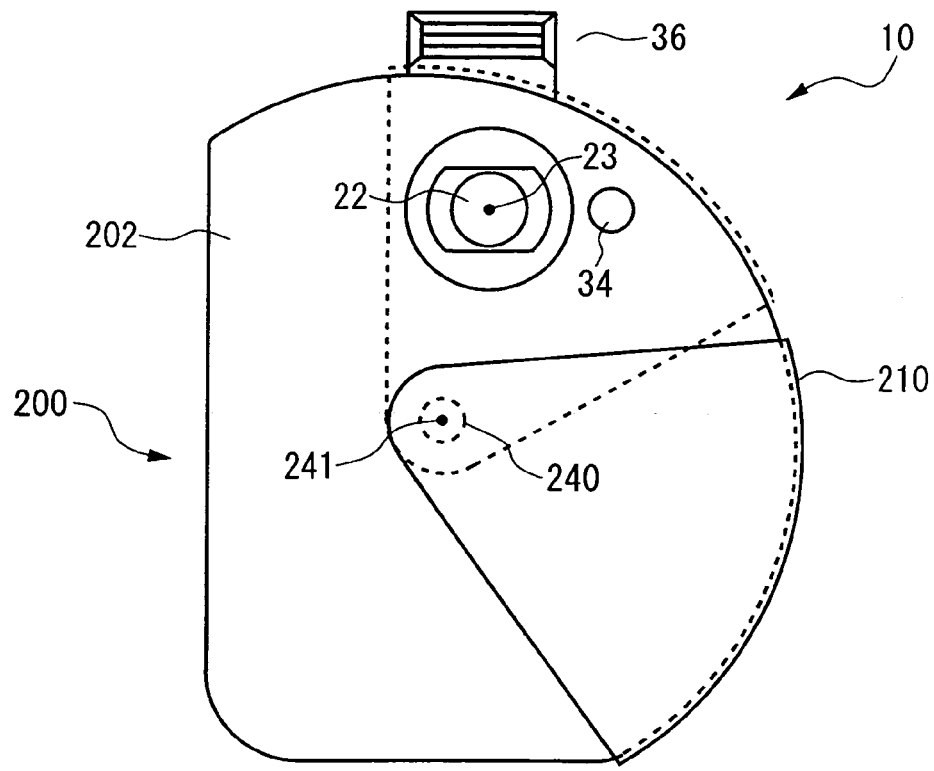
FIGS. 8A and 8B illustrate another exemplary lens barrier 210.
Figure 8B:
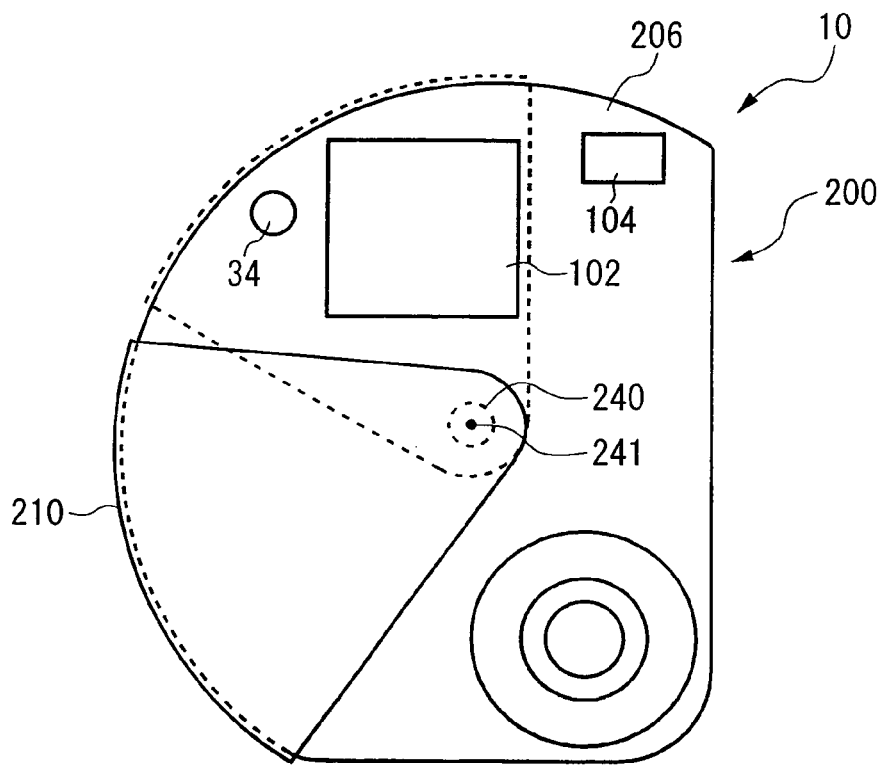

FIGS. 8A and 8B show another example of the lens barrier 210. The lens barrier 210 is provided so as to always expose the LCD panel 104. That is, the LCD panel 104 is provided at such a position that the lens barrier 210 does not reach the LCD panel 104 to cover it. Thus, even if the LCD monitor 102 is covered, the user can perform the operation in the operation mode which is currently set with reference to the contents displayed on the LCD panel 104.

As for the operation buttons (not shown), it is preferable that the lens barrier 210 not cover the operation button that can be used in the currently set operation mode, but cover only the operation buttons that cannot be used. Thus, since the number of operation buttons that are exposed at a given time is limited, the possibility that the user performs wrong operations can be reduced. Moreover, it is possible to prevent the user from touching the buttons by mistake.

Figure 9A:
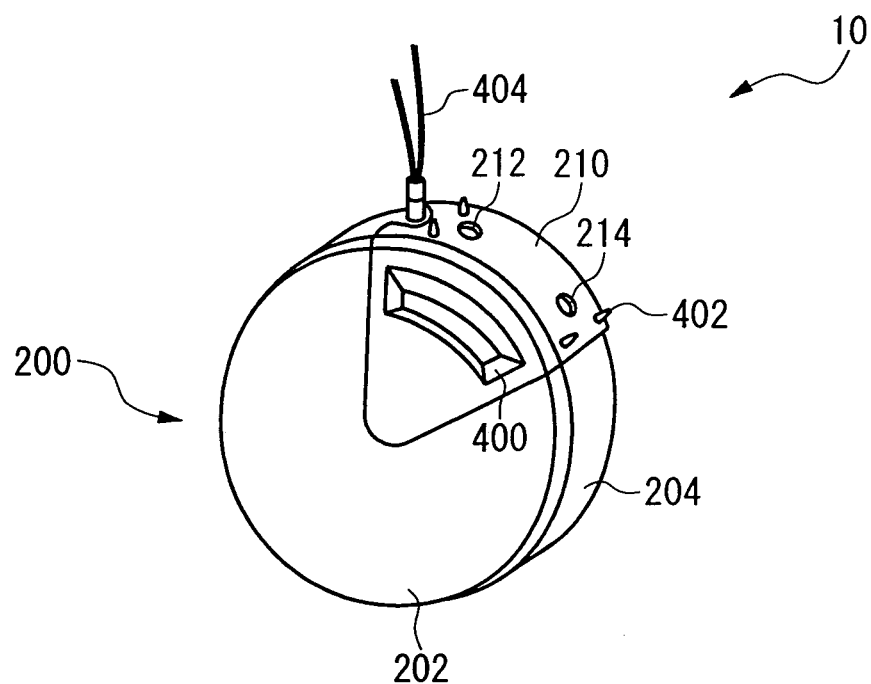
FIGS. 9A and 9B show an appearance of a digital camera according to a second embodiment of the present invention.
Figure 9B:
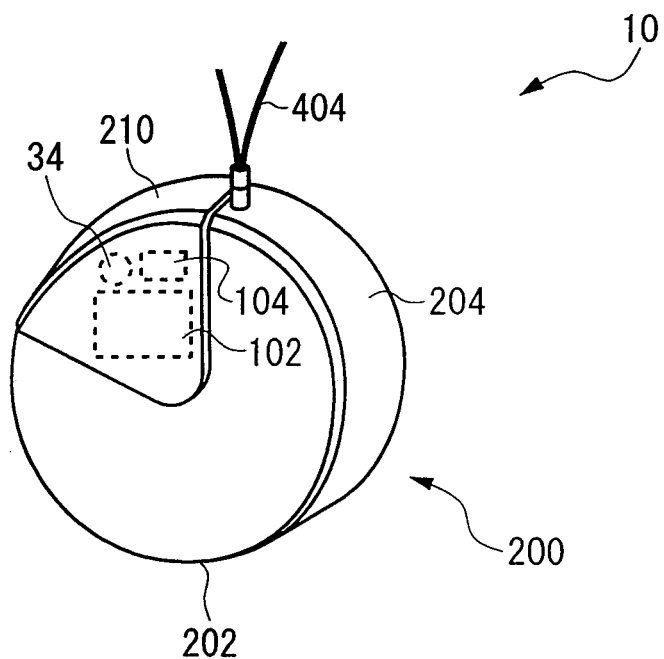

FIGS. 9A and 9B show the appearance of the digital camera 10 in a second embodiment of the present invention. FIG. 9A shows the front face 202 of the digital camera 10 while FIG. 9B shows the back face of the digital camera 10. The body 200 of the digital camera 10 in the present embodiment is formed to be substantially cylindrical in shape with the front face 202 and the back face 206 circular in shape. The lens barrier 210 is provided to be pivotally movable along the entire circumference of the body 200. In this point, the digital camera 10 of the present embodiment is different from that of the first embodiment.

The lens barrier 210 in the present embodiment includes a grip 400, for contact by a user's hand, on a face of the lens barrier 210 covering the front face 202 of the body 200. On a face of the lens barrier 210 that covers the side face 204, legs 402 are provided for stably supporting the digital camera 10. A strap 404 may be provided on the upper part of the side face 204.

The lens barrier 210 shown in FIGS. 9A and 9B stops in the upper region of the body 200 while covering the lens section 22, the finder 34 and the electronic flash 36, which are not shown in FIGS. 9A and 9B. That is, in the arrangement shown in FIGS. 9A and 9B, the stop mode is set.

Figures 10A, 10B:
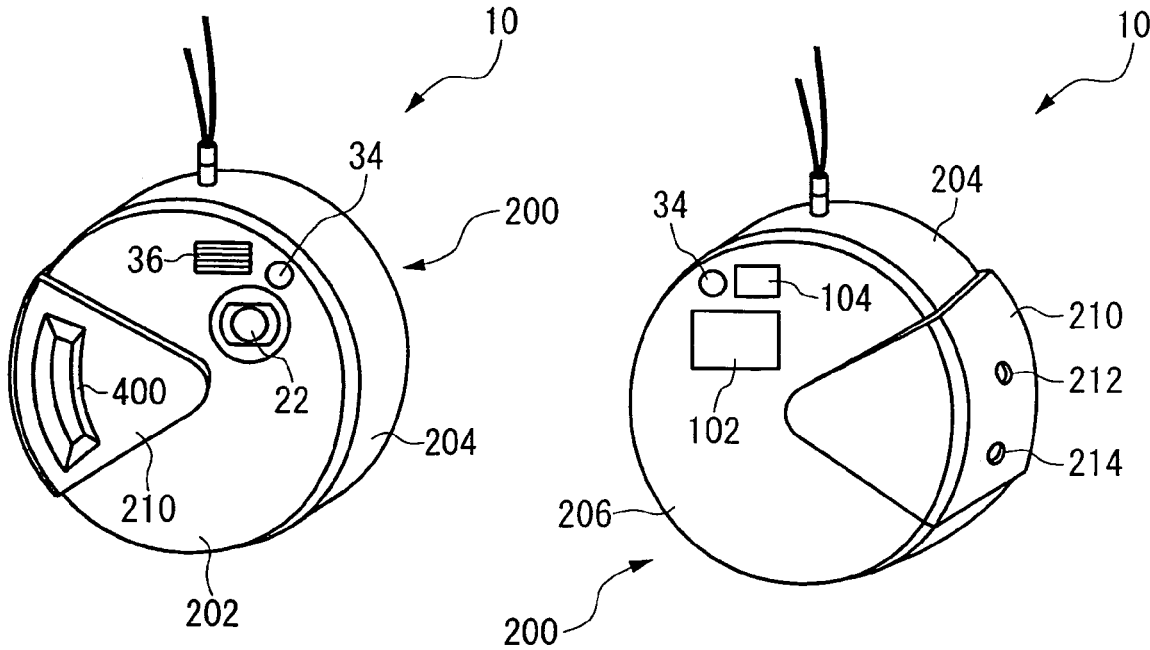
FIGS. 10A, 10B and 10C illustrate the digital camera 10 when the lens barrier 210 is positioned on the left side or the right side of the body 200 according to a second embodiment of the present invention.

FIG. 10A shows the front face 202 of the digital camera 10 in a case where the lens barrier 210 is positioned on the left side (as viewed in FIG. 10A) of the digital camera 10. FIG. 10B shows the back face 206 of the digital camera 10 corresponding to FIG. 10A. In this case, the operation mode is set to the image capture mode. Since the grip 400 is provided at a convenient position where a user typically places a hand, the user can stably hold the digital camera 10. Moreover, the LCD monitor 102 and the LCD panel 104 provided on the back face 206 are not covered by the lens barrier 210.

Figure 10C:
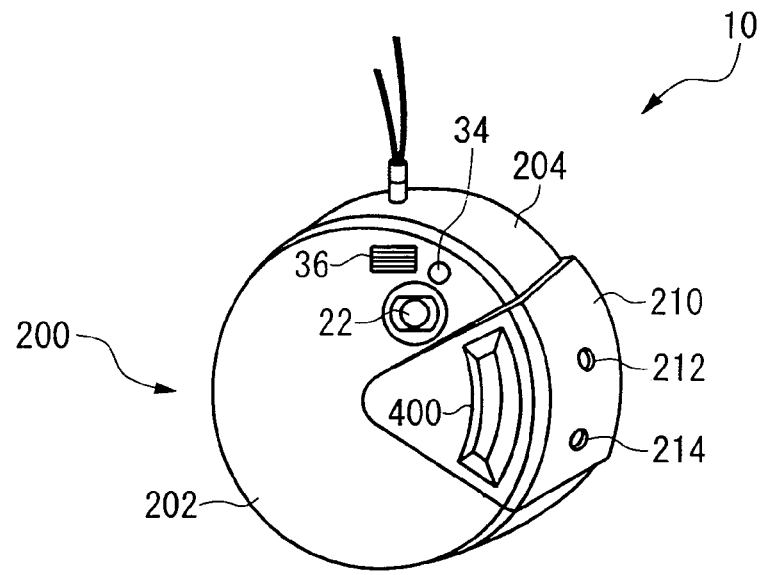

FIG. 10C shows the front face 202 of the digital camera 10 in a case where the lens barrier 210 stops on the right side (as viewed in FIG. 10C) of the digital camera 10. Also, in this case, the operation mode is set to the image capture mode, and the lens section 22, the finder 34, the electronic flash 36, and the LCD monitor 102 and the LCD panel 104 provided on the back face 206 are not covered by the lens barrier 210. The grip 400 is located at a position where the user's hand is placed on the right side of the digital camera 10. As described above, when the lens barrier 210 stops on the right side or the left side of the digital camera 10, the operation mode is set to the image capture mode. Thus, both a right-handed person and a left-handed person can operate the digital camera 10 without difficulty.

Figure 11A:
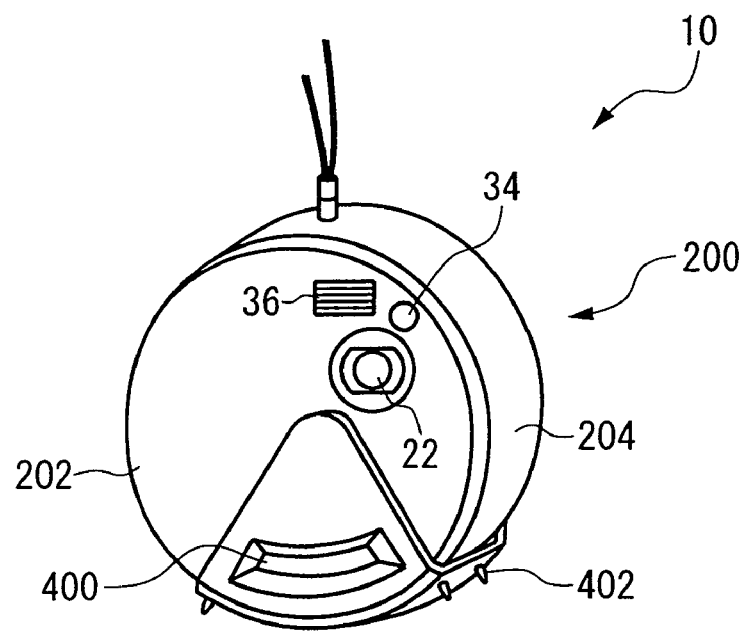
FIGS. 11A and 11B show the digital camera 10 when the lens barrier 210 is located on the bottom side of the body 200 according to a second embodiment of the present invention.
Figure 11B:
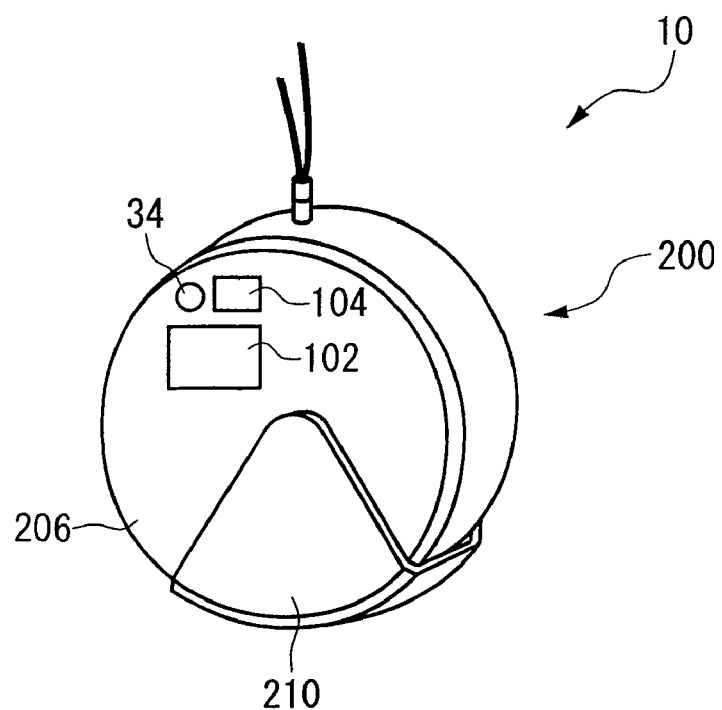

FIG. 11A shows the front face 202 of the digital camera 10 when the lens barrier 210 stops on the bottom side of the digital camera 10, and FIG. 11B shows the back face 206 thereof. Since the lens barrier 210 includes the legs 402, which are provided on the face of the lens barrier 210 covering the side face 204, the digital camera 10 can be stably placed on the legs 402. In this state, the operation mode is set to a self-timer capture mode. As described above, even if the digital camera 10 has a substantially cylindrical shape, the digital camera 10 can still be stably placed so as to allow the capture of a self-timer image.

Alternatively, the operation mode may be set to the playback mode when the lens barrier 210 is positioned on the bottom side of the digital camera 10. In this case, the selection of either the playback mode or the self-timer image capture mode is performed by means of the function setting section 116. Thus, it is possible to look through the reproduced images while the digital camera 10 is placed stably on the legs 402.

Additional arrangement and operations of the digital camera 10 of the present embodiment, which are other than the arrangement and the operations described referring to FIGS. 9A to 11B, are the same as those in the first embodiment described referring to FIG. 1 to FIG. 8B, and, therefore, a description is omitted here.

Figure 12A:
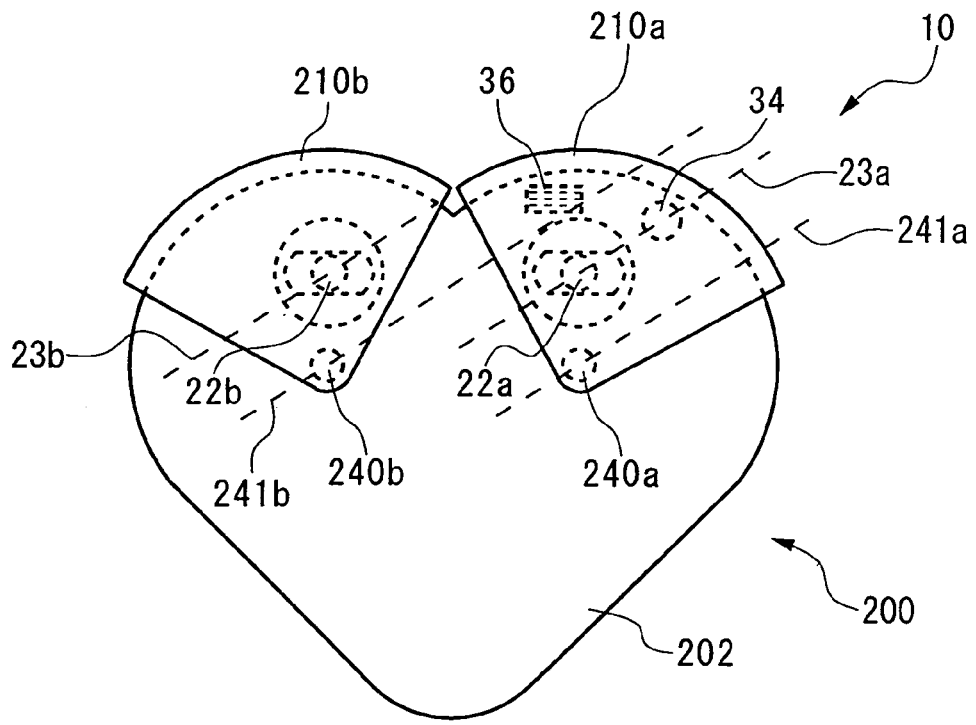
FIGS. 12A and 12B show a digital camera according to a third embodiment of the present invention.
Figure 12B:
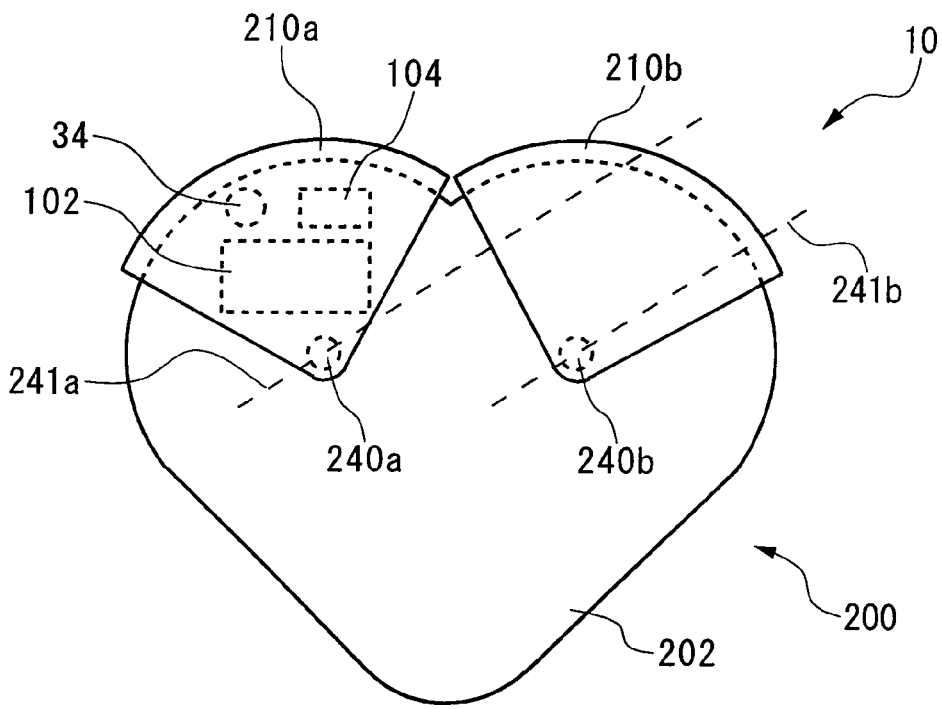
Figure 15:
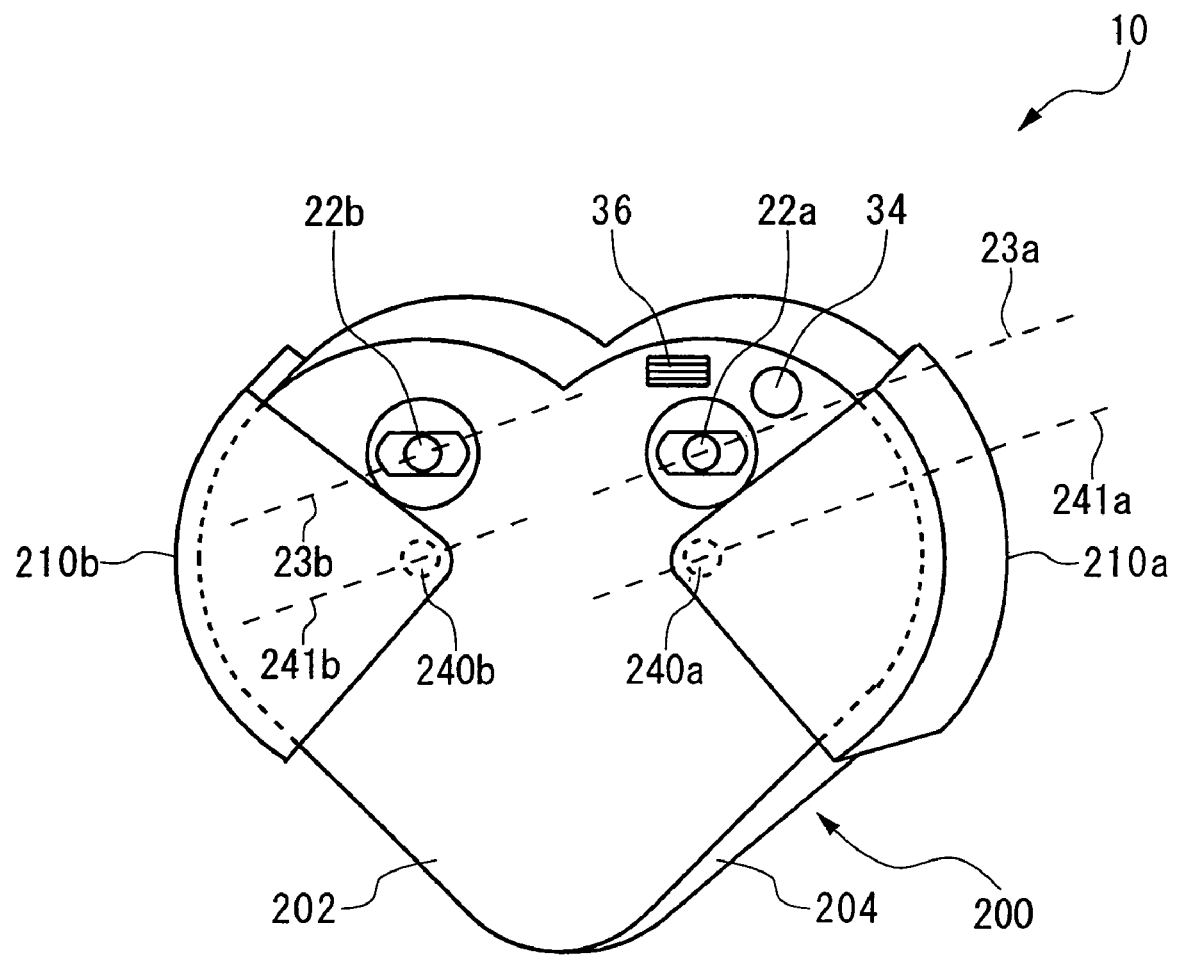
FIG. 15 illustrates a side view of the digital camera 10 according to a third embodiment of the present invention.

FIG. 12A shows the front face 202 of the digital camera 10 according to a third embodiment of the present invention, and FIG. 12B shows the back face 206 thereof. The body 200 of the digital camera 10 of the present embodiment includes the front face 202 and the back face 206 having a generally heart-like shape. The digital camera 10 includes the first and second lens sections 22a and 22b each of which is capable of forming an image, and the first and second lens barriers 210a and 210b for protecting the first and second lens sections 22a and 22b, respectively. The first and second lens sections 22a and 22b are arranged so as to be substantially parallel to each other in the upper region of the front face 202. The first and second lens barriers 210a and 210b cover the front face 202, the back face 206, and the side face 204 between the front face 202 and the back face 206. The first and second lens barriers 210a and 210b can pivot, independently of each other, around respective axes 241a and 241b (see FIG. 15) which are substantially parallel to corresponding optical axes 23a and 23b (note again FIG. 15) of the first lens section 22a and second lens section 22b. In this point, the digital camera 10 of the present embodiment is different from those of the first and second embodiments.

Each of the first and second lens sections 22a and 22b can converge an image. Moreover, the first and second lens sections 22a and 22b can capture the images simultaneously, and, therefore, the operation modes of the digital camera 10 include a single-image capture mode in which one image is captured and a double-image capture mode in which two images are simultaneously captured. When only the first lens section 22a is exposed, the single-image capture mode is set as the operation mode. On the other hand, when both the first and second lens sections 22a and 22b are exposed, the double-image capture mode is set. In FIGS. 12A and 12B, both the first and second lens barriers 210a and 210b are closed. In this case, the operation mode is set to the stop mode and the power is automatically turned off.

The structure of the digital camera 10 of the present embodiment is described referring to FIG. 1. The digital camera 10 of the present embodiment includes first and second diaphragms 24; first and second shutters 26; first and second optical LPFs 28; first and second CCDs 30; first and second capture-signal processors 32; first and second diaphragm drivers 46a and 46b; and first and second shutter drivers 48 in such a manner that the first elements correspond to the first lens section 22a while the second elements correspond to the second lens section 22b. The first lens section 22a may be a zoom lens having a variable magnification to realize zooming and focusing of the digital camera 10. The second lens section 22b is a fixed magnification lens having a fixed magnification that is set to be equal to the image capturing magnification when the first lens section 22a is positioned at a wide-end. The arrangement and the operations of these elements are the same as those described by referring to FIG. 1. In addition, the memory controller 64 in the present embodiment can receive two images simultaneously from the first and second capture-signal processors 32 and can record these images onto the main memory 68. The arrangement and the operations other than those described above are the same as those in the first embodiment described referring to FIG. 1, and, therefore, a description is omitted here.

Figure 13:
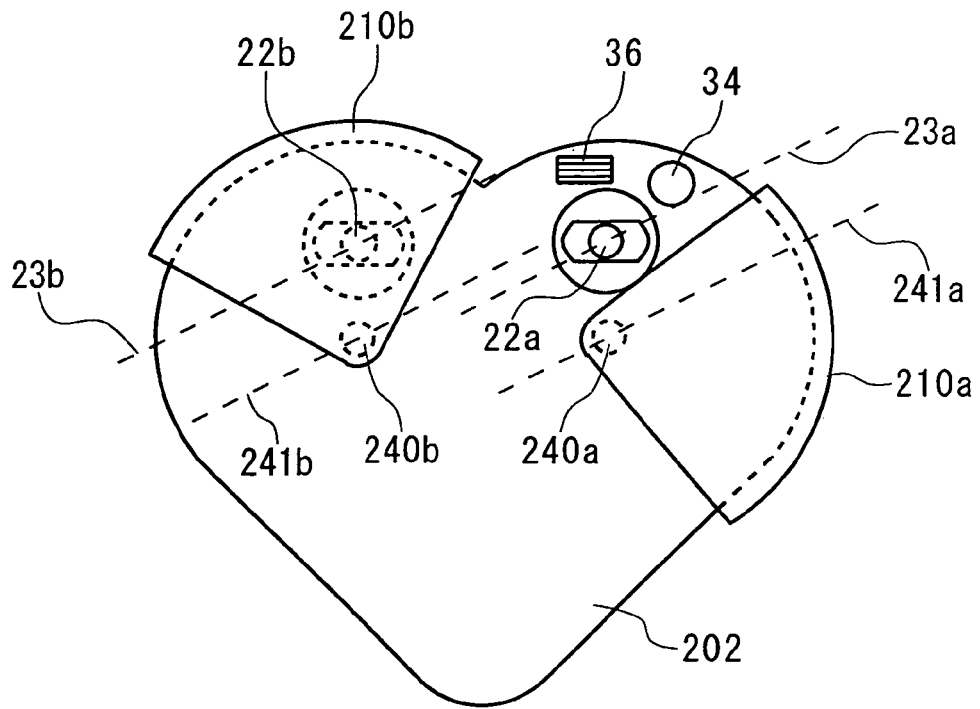
FIG. 13 illustrates the digital camera 10 when the first lens barrier 210a is open while the second lens barrier 210b is closed.

FIG. 13 shows the front face 202 of the digital camera 10 when the first lens barrier 210a is opened whereas the second lens barrier 210b is closed. In this case, the operation mode is set to the single-image capture mode. In the single-image capture mode, the first lens section 22a captures the image. Thus, in the single-image capture mode, the digital camera 10 can capture the image in substantially the same manner as a digital camera including only one lens section 22. Moreover, the second lens 22b, which is not used in the single-image capture mode, can be protected by the second lens barrier 210b.

Figure 14:
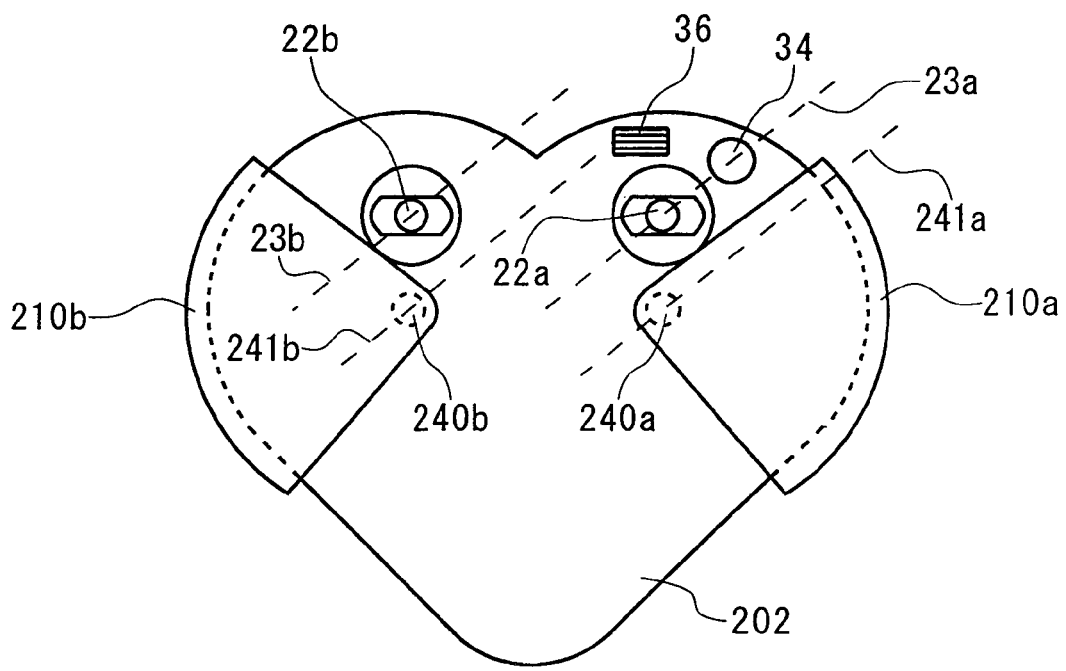
FIG. 14 shows the digital camera 10 when both the first and second lens barriers 210a and 210b are open.

FIG. 14 shows the digital camera 10 when both the first and second lens barriers 210a and 210b are opened. In this case, the operation mode is set to the double-image capture mode. In the double-image capture mode, both the first and second lens sections 22a and 22b capture images.

Since the first and second lens sections 22a and 22b are separated from each other by a distance approximately equal to a typical interocular distance, a stereoscopic image (3D image) can be captured in the double-image capture mode. In addition, the first and second lens sections 22a and 22b can capture images of different magnifications. Moreover, the first and second lens sections 22a and 22b can capture images with different magnifying power and perform the image capturing with different magnifying power in the double-image capture mode. As described above, since the operation mode of the digital camera 10 is changed depending on the positions of the lens barriers 210a and 210b, the user can perform single-image capturing and double-image capturing.

Also in the present embodiment, the lens barriers 210a and 210b can protect not only the lens sections 22a and 22b but also the LCD monitor 102 and the LCD panel 104 when the lens barriers 210a and 210b are at the stopped or shut-off positions, as described above in connection with the first and second embodiments.

Alternatively, instead of the second lens section 22b, a speaker may be provided on the left side of the digital camera 10. This enables a user to listen to music while taking pictures.

Additional arrangement and the operations of the digital camera 10 of the present embodiment, which are other than those described above, are the same as those in the first embodiment described by referring to FIG. 1, and, therefore, a description is omitted here.

In the above description, the lens barrier 210 is arranged to pivotally move around the lens barrier attachments 240 as the rotation axis. However, the lens barrier attachments 240 may be provided in a substantially elliptical shape. In this case, the lens barrier 210 can move pivotally and linearly. Therefore, even in a case where the body 200 has a complicated shape, the lens barrier 210 can move along the outer periphery of the body 200. As described above, the trace of the movement of the lens barrier 210 is not limited as long as the lens barrier 210 covers and uncovers the lens section 22 by the movement thereof including the pivotal movement. Also, the lens barrier attachment 240 can have a higher degree of freedom in design.

In the above description, the rotational axis 241 is located approximately at the center of the body of the camera 10. However, the rotational axis may be provided on an outer peripheral portion of the body.

Figure 16:
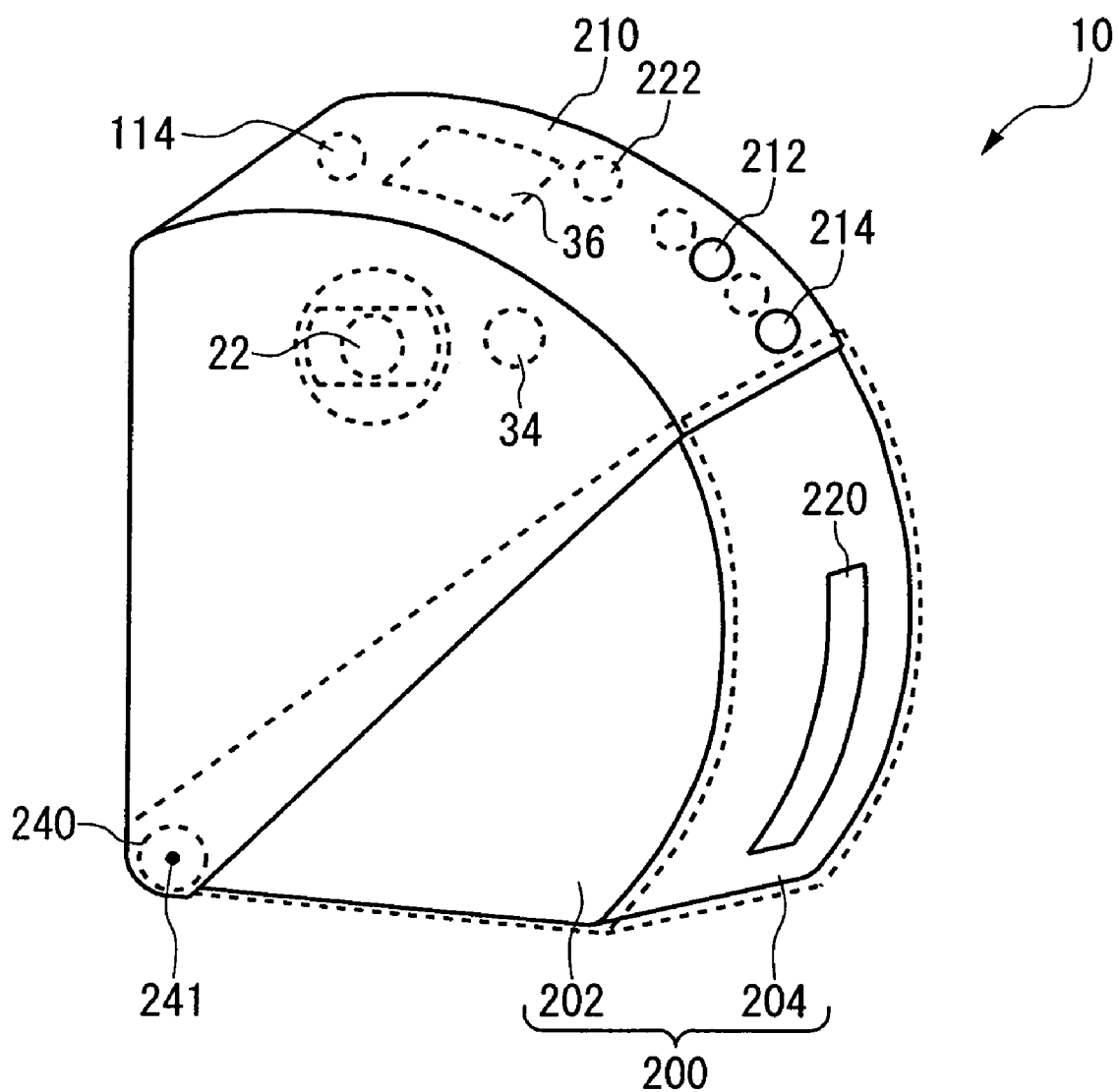
FIG. 16 schematically shows an appearance of a digital camera according to a fourth embodiment of the present invention.

FIG. 16 schematically shows an appearance of a digital camera according to a fourth embodiment of the present invention. In this embodiment, the rotational axis 241 is located at the outer periphery of the body. More specifically, the rotational axis 241 is positioned near the outer peripheral corner of the body 200. Other parts or units are similar to the first embodiment, and therefore detailed descriptions are omitted here.

Moreover, only one opening may be provided in the lens barrier 210, although the lens barrier 210 described above includes two openings 212 and 214 in the above embodiments. In this case, the video output terminal 90, the charge connector 224 and the connector 92 may be arranged so as to be exposed by turns.

In addition, the lens barrier 210 may include only one opening having a size that allows all of the video output terminal 90, the charge connector 224 and the connector 92 to be exposed simultaneously. In this case, three operation modes in which the terminal 92 and the connectors 92 and 224 are respectively used can be replaced with only one operation mode in which all of the terminal and the connectors can be used. Alternatively, the lens barrier 210 may include only one opening having a size that allows any two of the terminal and connectors to be simultaneously used.

Furthermore, the lens barrier 210 may include one opening for each of the video output terminal 90, the charge connector 224 and the connector 92. That is, the lens barrier 210 may include three openings. As described above, the size and the number of the openings is not limited to those described in the foregoing embodiments of the present invention, and substantial freedom exists in designing the digital camera.

As described above, according to the present invention, the lens barrier can be opened/closed by a pivot movement while the lens barrier covers three faces of the body of the digital camera.

Although the present invention has been described by way of exemplary embodiments, it should be understood that many changes and substitutions may be made by those skilled in the art without departing from the spirit and the scope of the present invention which is defined only by the appended claims.

What is claimed is:

1. An image capturing apparatus, comprising:
   a body;
   a first lens section provided in said body operable to converge an image;
   a second lens section provided in said body operable to converge an image, said second lens section being substantially parallel to said first lens section;

a first lens cover provided on said body operable to cover said first lens section; and a second lens cover provided on said body operable to cover said second lens section, said second lens cover being movable independently of said first lens cover; and an operating unit which changes an operation mode of the image capturing apparatus depending on positions of said first and second lens covers, having modes including:

a first mode in which said first lens section is not covered by said first lens cover while said second lens section is covered by said second lens cover and one image is captured through said first lens section;

a second mode in which both said first lens section and said second lens section are not covered by said first lens cover and said second lens cover, respectively, and two images are simultaneously captured through said respective first and second lens sections; and a third mode in which both said first lens section and said second lens section are covered by said first lens cover and said second lens cover, respectively, and the power to the image capturing apparatus is turned off.

2. The image capturing apparatus as claimed in claim 1, wherein said first and second lens sections are separated from each other by a distance approximately equal to a typical interocular distance.

3. The image capturing apparatus as claimed in claim 1, wherein said first and second lens sections capture images of different magnifications.

4. The image capturing apparatus as claimed in claim 1, wherein said first and second lens sections capture images with different magnifying power and perform the image capturing with different magnifying power in said second mode.

5. An image capturing apparatus as claimed in claim 1, wherein said front face and said back face of said body have generally heart-like shapes, and said first lens section and said second lens section are arranged on an upper portion of said front face.

6. An image capturing apparatus as claimed in claim 1, wherein said first and second lens sections are operable to capture a stereoscopic image in said second mode.

7. An image capturing apparatus as claimed in claim 1, wherein said first and second lens covers are removable from said body.

8. An image capturing apparatus as claimed in claim 1 wherein the third mode comprises a stop mode and the image capturing apparatus is automatically turned off when the first and second lenses are covered respectively by the first and second lens covers.

* * * * *